METHOD FOR PRODUCING EXTREMELY THIN LINE MASKS

Filed Dec. 30, 1959

INVENTOR
ROBERT D. McNUTT
BY Frederick J. Smyth
ATTORNEY

United States Patent Office 3,036,962

Patented May 29, 1962

3,036,962

METHOD FOR PRODUCING EXTREMELY THIN LINE MASKS

Robert D. McNutt, Poughkeepsie, N.Y., assignor to International Business Machines Corporation, New York, N.Y., a corporation of New York Filed Dec. 30, 1959, Ser. No. 863,004

5 Claims. (Cl. 204—143)

This invention relates to a method for producing extremely thin line masks and more particularly to a method for producing in sheet material apertures having a width in the order of one-tenth the thickness of the material.

According to the prior art, there are many methods for producing apertures in sheet material in an economical and efficient manner. Recently, in the vacuum evaporation of thin films, it has been found desirable to produce pattern defining masks having extremely thin lines, slits, or slots therein. As a particular example, in fabricating thin film superconductive circuits of the type disclosed in copending application Serial No. 625,512, filed November 30, 1956, on behalf of Richard L. Garwin and assigned to the assignee of this invention, the deposited superconductive material is required to be several thousand Angstrom units in thickness and about three ten-thousandths of an inch in width. To produce these precise lines of superconductive material by thermal evaporation of the material in a vacuum, masks containing very thin slits, having sharply defined edges, are required.

However, it has been found that it is not readily possible to fabricate apertures in sheet material by any of the methods of the prior art, wherein the width of the aperture is substantially less than the thickness of the sheet material. For this reason, the sheet material having the required narrow apertures would necessarily be too thin to form the desired precise deposits of material, or alternatively, if thicker masks are employed, the apertures formed therein would be too wide to properly define the area to which the deposited material is to be applied.

What has been discovered is a novel combination of steps whereby narrow apertures having precise and sharply defined edges are formed in sheet material. Briefly, the method of the invention includes the steps of coating the sheet material with an acid resist, shearing the material along the lines determined by the desired apertures, separating the abutting sheared edges with an acid resistant material, and electropolishing the exposed edges only, to obtain the required aperture width.

It is an object of the invention to provide an improved method of producing extremely thin line masks.

Another object of the invention is to provide a method for producing apertures in sheet material having a width substantially less than the thickness of the sheet material.

A further object of the invention is to provide an improved method of fabricating precision pattern masks useful in the vacuum evaporation of thin film superconductive circuits.

Still another object of the invention is to provide a method of producing apertures in sheet material having a width in the order of one-tenth the thickness of the sheet material.

The foregoing and other objects, features and advantages of the invention will be apparent from the following more particular description of a preferred embodiment of the invention, as illustrated in the accompanying drawings.

Figure 1:
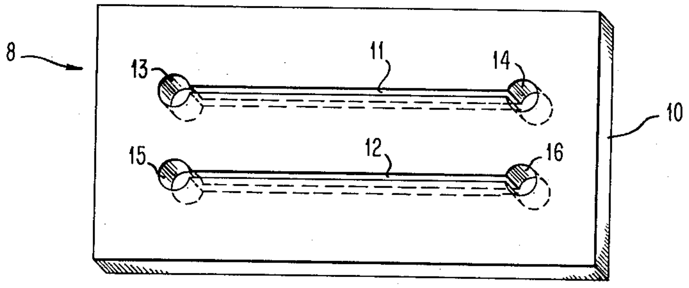
FIG. 1 is a view of a pattern mask, fabricated according to the method of the invention.

Although the method of the invention is adaptable to various arts wherein it is desired to obtain narrow apertures in sheet material, it is illustrated herein to produce a pattern mask, having a pair of longitudinal slots by way of example, which is employed in the vacuum deposition of thin film superconductive circuits of the type disclosed in the hereinabove referenced copending application. Referring now to the drawings, FIG. 1 illustrates a pattern mask fabricated in accordance with the principles of the invention. As shown therein, a pattern mask 8 includes a sheet of material 10 provided with a pair of longitudinal slots 11 and 12 which terminate in a pair of locating holes 13, 14, and 15, 16, respectively. For the application being described, mask 8 is preferably fabricated of stainless steel having a thickness of 0.003 inch. Each of slots 11 and 12 has a width of 0.00025 inch and a length as determined by the circuit which mask 10 is designed to fabricate.

In making this mask in accordance with the method of the invention a sheet of stainless steel, 10, 0.003 inch thick, is provided having a length and width as determined by the ultimate mask holding means wherein the mask is employed. Next, sheet 10 is thoroughly cleaned to remove all foreign particles therefrom either by washing in any of the well-known solutions and then dried, or cleaned ultrasonically. Sheet 10 is then dipped into, or sprayed by, a suitable light sensitive coating which is effective to produce an acid resist after processing. This coating step is continued for a time sufficient to ensure that the entire surface area of the sheet is coated. The light sensitive coating material is selected from any of those commercially available as, by way of example, that presently marketed under the trademark "Kodak Photo Resist." The coated sheet is then processed by subjecting sheet 10 to a temperature of 100° C. for about ten minutes, the actual baking time and temperature being determined by the coating material employed. Next, the sheet is then completely exposed to a high intensity light source and developed, so that the coating is thing, and acid and abrasive resistant.

Figure 2:
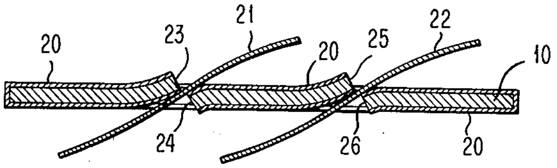
FIG. 2 is a cross-section view of an intermediate step in the method of the invention.

As the next step in the method of the invention, sheet 10 is sheared at the locations of the desired apertures. First, a pair of locating holes are punched through the material, each pair of holes determining the terminations of the thin apertures to be processed by the method of the invention. As is seen in FIG. 1, hole pair 13 and 14 define the excursion of aperture 11 and hole pair 15 and 16 define the excursion of aperture 12. Further, these locating holes, which are illustrated undersized in FIG. 1 in order to fully show the thin apertures in mask 8, are effective to allow the edges formed by the shearing operation to be separated as will be understood as the description proceeds. This shearing operation is effective to only part the sheet and does not remove any material therefrom. Further, the sheared lines are of the length required by apertures 11 and 12. Next, the sheared sheet is prepared for an electropolishing operation by spreading the abutting edges of the sheared lines apart and inserting a non-conductive acid-resistant material between the edges. Referring now to FIG. 2, there is shown sheet 10 having an acid resist coating 20 completely covering the surface thereof, the edges 23, 24 and 25, 26 resulting from the shearing operation being free of coating 20. The edges are next separated as shown in FIG. 2 by sections of an acid-resistant, non-conductive material 21 and 22. Sections 21 and 22 may be, by way of example, fabricated of polytetrafluoroethylene which is presently marketed under the trademark "Teflon." Further, sections 21 and 22 are effective to expose both pairs of edges 23, 24 and 25, 26, without damage to the acid resist coating 20 covering the surface of sheet 10.

Figure 3:
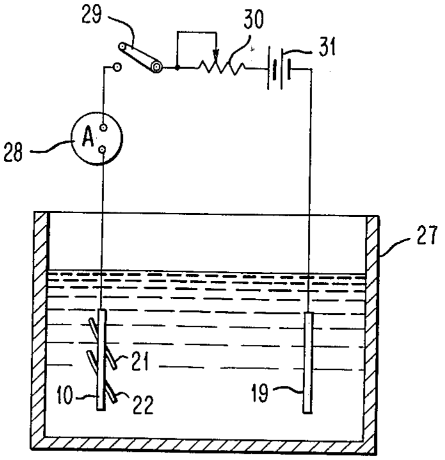
FIG. 3 illustrates another intermediate step in the method of the invention.

The next step in the process is to perform an electropolishing operation to remove a predetermined amount of material from each pair of edges 23, 24 and 25, 26, only. Referring now to FIG. 3, there is shown a suitable container 27 for holding an 85% phosphoric acid solution, with sheet 10 and a nickel cathode 19 immersed therein. Electrically connected in series between sheet 10 and cathode 19 are an ammeter 28, a switch 29, a potentiometer 30 and a D.C. power source 31. Closure of switch 29 is effective to cause a current to flow through the series circuit, including sheet 10 and cathode 19 to electropolish the exposed edges 23, 24, and 25, 26 separated by sections 21 and 22 in a manner well known in the art. The current, which is indicated by ammeter 28, is controlled by potentiometer 29 to a level sufficient to yield uniform and sharp faces on edges 23, 24 and 25, 26, but below the level that would result in pitting and uneven removal of material from the exposed edges of sheet 10. In forming the mask of the herein described example, a current of 2 amperes flowing for 0.5 minute was effective to form apertures 0.00025 inch wide in the 0.003 inch mask.

The final step in the method is to withdraw mask 10 from within container 27 and remove the acid-resistant, non-conductive material sections 21 and 22, allowing sheet 10 to return to the form indicated in FIG. 1. Further, it is next necessary to remove the acid resist with a suitable cleaner, depending on the coating material employed. Although the illustrative example has been described with reference to a single pattern mask, it will be apparent that the method of the invention may be employed to simultaneously produce two or more pattern masks or other devices to thereby form apertures having a width substantially less than the thickness of the sheet material.

While the invention has been particularly shown and described with reference to a preferred embodiment thereof, it will be understood by those skilled in the art that various changes in form and details may be made therein without departing from the spirit and scope of the invention.

What is claimed is:

1. A method for producing apertures in sheet material, said apertures having a width substantially less than the thickness of said sheet material, comprising the steps of; coating said sheet material with an acid resist; shearing said sheet material and said resist along predetermined lines determined and limited by said apertures; separating the abutting faces of each of said sheared lines by an electrically non-conductive acid-resistant material to only expose the uncoated edges of said faces; and electropolishing said uncoated edges to remove a controlled amount of material therefrom.

2. A method of producing extremely thin line pattern masks comprising the steps of; coating a sheet of material with an acid resist; shearing said coated sheet to form a thin line within and through said sheet; separating said sheared sheet to only expose the uncoated edges of the openings formed by said shearing operation; and electropolishing said exposed edges, whereby an aperture is formed in said sheet having a width less than the thickness of said sheet.

3. A method of fabricating precision pattern masks having apertures therein comprising the steps of; providing a sheet of material having a predetermined thickness; cleaning said sheet to remove foreign particles therefrom; coating the entire surface of said sheet with a light sensitive material; subjecting said coated sheet to a predetermined temperature; exposing said sheet to a source of light and thereafter developing said light sensitive material to form a thin coating which is acid and abrasive resistant; punching a pair of circular holes for each of said apertures, said holes defining the excursions of said apertures; shearing said coated sheet between each pair of aperture defining holes; separating the abutting uncoated faces of each of said sheared lines by means of an electrically non-conductive acid-resistant material; said separating step being effective only to expose said uncoated faces and electropolishing said uncoated faces in an 85% phosphoric acid solution to remove a predetermined amount of material therefrom.

4. The method of claim 3 wherein said non-conductive acid-resistant material is polytetrafluoroethylene.

5. A method of producing a precision pattern defining mask, said mask formed of a planar sheet of material having a thickness sufficient to register precise deposits of vacuum deposited material upon a substrate and including apertures therein having a width substantially less than said thickness, which method comprises; forming a coating on all of the external surfaces of said sheet of material; said coating being both acid and abrasive resistant; shearing said sheet along lines determined by the desired apertures; said shearing operation being effective only to part said sheet and being ineffective to remove any material therefrom; separating said sheared sheet a predetermined amount only to expose the uncoated edges of the openings formed by said shearing operation; and electropolishing said exposed edges, said electropolishing operation being effective to form the desired aperture widths.

References Cited in the file of this patent

UNITED STATES PATENTS

| | | |
|---|---|---|
| 2,496,299 | Mansfield et al. | Feb. 7, 1950 |
| 2,584,612 | Piety | Feb. 5, 1952 |